(12) United States Patent
Chauvet et al.

(10) Patent No.: US 11,100,056 B2
(45) Date of Patent: Aug. 24, 2021

(54) LIFE CYCLE DATA SET REPOSITORY

(71) Applicant: International Business Machines Corporation, Armonk, NY (US)

(72) Inventors: Philip R. Chauvet, Tucson, AZ (US); Andrew E. Deiss, McNeal, AZ (US); Kenneth J. Owin, Tucson, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 15/157,281

(22) Filed: May 17, 2016

(65) Prior Publication Data

US 2017/0337235 A1 Nov. 23, 2017

(51) Int. Cl.
*G06F 16/00* (2019.01)
*G06F 16/185* (2019.01)

(52) U.S. Cl.
CPC .................. *G06F 16/185* (2019.01)

(58) Field of Classification Search
CPC .............. G06F 3/0619; G06F 11/1456; G06F 11/1458; G06F 3/0649; G06F 3/0685; G06F 17/30215; G06F 11/1435; G06F 11/2089; G06F 11/2094; G06F 17/30194; G06F 2201/85; G06F 3/0481; G06F 3/04847; G06F 16/958; G06F 16/972; G06F 16/9535; G06F 16/438; G06F 16/48; G06F 3/04842; G06F 9/44505; G06F 8/71; G06F 11/34; G06F 11/3423; G06F 11/3447; G06F 12/0811; G06F 16/14; G06F 16/2365; G06F 2212/1016; G06F 2212/601; G06F 3/04166; G06F 40/30; G06F 9/451; G06F 9/46; G06F 9/546

See application file for complete search history.

(56) References Cited

U.S. PATENT DOCUMENTS

| | | | |
|---|---|---|---|
| 5,659,743 A * | 8/1997 | Adams | .................. G06F 3/0601 |
| 7,526,494 B2 | 4/2009 | Rom et al. | |
| 7,881,995 B2 | 2/2011 | Grimberg | |
| 8,515,910 B1 | 8/2013 | Certain et al. | |
| 8,768,962 B2 * | 7/2014 | Laron | .................. G06F 16/1734 |
| | | | 707/781 |
| 8,931,107 B1 | 1/2015 | Brandwine | |
| 9,087,092 B2 | 7/2015 | Doster et al. | |
| 9,792,298 B1 * | 10/2017 | Taylor | ............... G06F 17/30215 |

(Continued)

*Primary Examiner* — Shyue Jiunn Hwa
(74) *Attorney, Agent, or Firm* — Nelson IP; Daniel P. Nelson

(57) ABSTRACT

A method for tracking actions performed in association with a data set includes identifying multiple sources of historical information describing actions performed on the data set. The method periodically gathers this historical information from the multiple sources and compiles the historical information in a centralized repository. In certain embodiments, the method stores the historical information in the form of individual records associated with the data set. In the event any actions performed on the data set are the result of policies established for the data set, the method determines the policies associated with the actions where possible. The method includes these policies with the historical information in the centralized repository. A corresponding system and computer program product are also disclosed.

17 Claims, 7 Drawing Sheets

(56) References Cited

U.S. PATENT DOCUMENTS

| | | | |
|---|---|---|---|
| 2005/0262097 A1* | 11/2005 | Sim-Tang | G06F 17/30085 |
| 2007/0011321 A1* | 1/2007 | Huntington | H04L 43/028 709/224 |
| 2009/0187711 A1* | 7/2009 | Amarendran | G06F 3/0619 711/117 |
| 2013/0173530 A1* | 7/2013 | Laron | G06F 16/1734 707/608 |
| 2014/0324928 A1 | 10/2014 | Tinker et al. | |
| 2014/0337664 A1* | 11/2014 | Gokhale | G06F 11/1464 714/6.3 |

* cited by examiner

| Life Cycle for Data Set X ||||||
|---|---|---|---|---|---|
| Date/Time | Action | Job Name | System Name | Policy | User ID |
| 1/25/16  5:59:21 | Delete | Job 6 | System E | Policy R | Null |
| 12/5/15  11:29:04 | Move | Job 5 | System F | Policy T | Null |
| 12/5/15  8:31:45 | Rename | Job 2 | System A | Null | User abc |
| 8/15/15  15:16:49 | Migrate | Job 7 | System C | Policy Z | Null |
| 7/21/15  23:45:06 | Migrate | Job 9 | System D | Policy Y | Null |
| 7/21/15  21:12:31 | Migrate | Job 9 | System D | Policy X | Null |
| 6/03/15  11:05:52 | Define | Job 1 | System A | Null | User xyz |

Fig. 7

LIFE CYCLE DATA SET REPOSITORY

BACKGROUND

Field of the Invention

This invention relates to systems and methods for tracking actions performed in association with data sets.

Background of the Invention

Tiered storage, also known as hierarchical storage, is a storage architecture typically containing high-cost and lost-cost storage media logically arranged into tiers. This architecture may be used to efficiently utilize high-cost and lost-cost storage media to provide a desired level of cost and performance. For example, certain high-speed storage devices, such as solid state drives, are faster and more expensive than storage devices such as hard disk drives, which are in turn faster and more expensive than magnetic tape drives or optical drives. While it may be desirable to store all data on faster storage devices such as solid state drives, this can be impractical and prohibitively expensive. Instead, tiered storage enables slower and less expensive storage devices to store the bulk of an enterprise's data. This data may then be moved or copied to faster storage devices when needed. This may enable faster devices to act as cache for slower devices.

In today's tiered storage systems, tiered-storage management software may continuously migrate data between storage tiers or volumes on the same storage tier in accordance with an established policy. However, when a data set in a tiered storage system goes missing, it can be extremely difficult for a user to determine what happened to the data set and/or why it happened. In certain cases, the user may need to retrieve historical and/or policy information from various disparate sources to try to piece together a picture of what took place. This information can be difficult to find and/or extract. In many cases, information that is needed is no longer available, making it difficult if not impossible to determine what actions were performed on the data set or the reasons for the actions.

In view of the foregoing, what are needed are systems and methods to track actions performed on data sets. Ideally, such systems and methods will enable a user to determine not only what actions were performed, but why the actions were performed. Further needed are systems and methods to gather historical information from disparate sources and compile and store this information for easy review and retrieval.

SUMMARY

The invention has been developed in response to the present state of the art and, in particular, in response to the problems and needs in the art that have not yet been fully solved by currently available systems and methods. Accordingly, the invention has been developed to track actions performed in association with data sets. The features and advantages of the invention will become more fully apparent from the following description and appended claims, or may be learned by practice of the invention as set forth hereinafter.

Consistent with the foregoing, a method for tracking actions performed in association with a data set is disclosed. In one embodiment, such a method includes identifying multiple sources of historical information describing actions performed on a data set. The method periodically gathers this historical information from the multiple sources and compiles the historical information in a centralized repository. In certain embodiments, the method stores the historical information in the form of individual records associated with the data set. In the event any actions performed on the data set are the result of policies established for the data set, the method determines the policies associated with the actions where possible. The method includes these policies with the historical information in the centralized repository. The centralized repository can be searched to document the life cycle of the data set and enable a user to determine what actions were performed on the data set and ideally why the actions were performed.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 is a high-level block diagram showing one exemplary format for displaying life cycle information associated with a data set.

DETAILED DESCRIPTION

Figure 1:
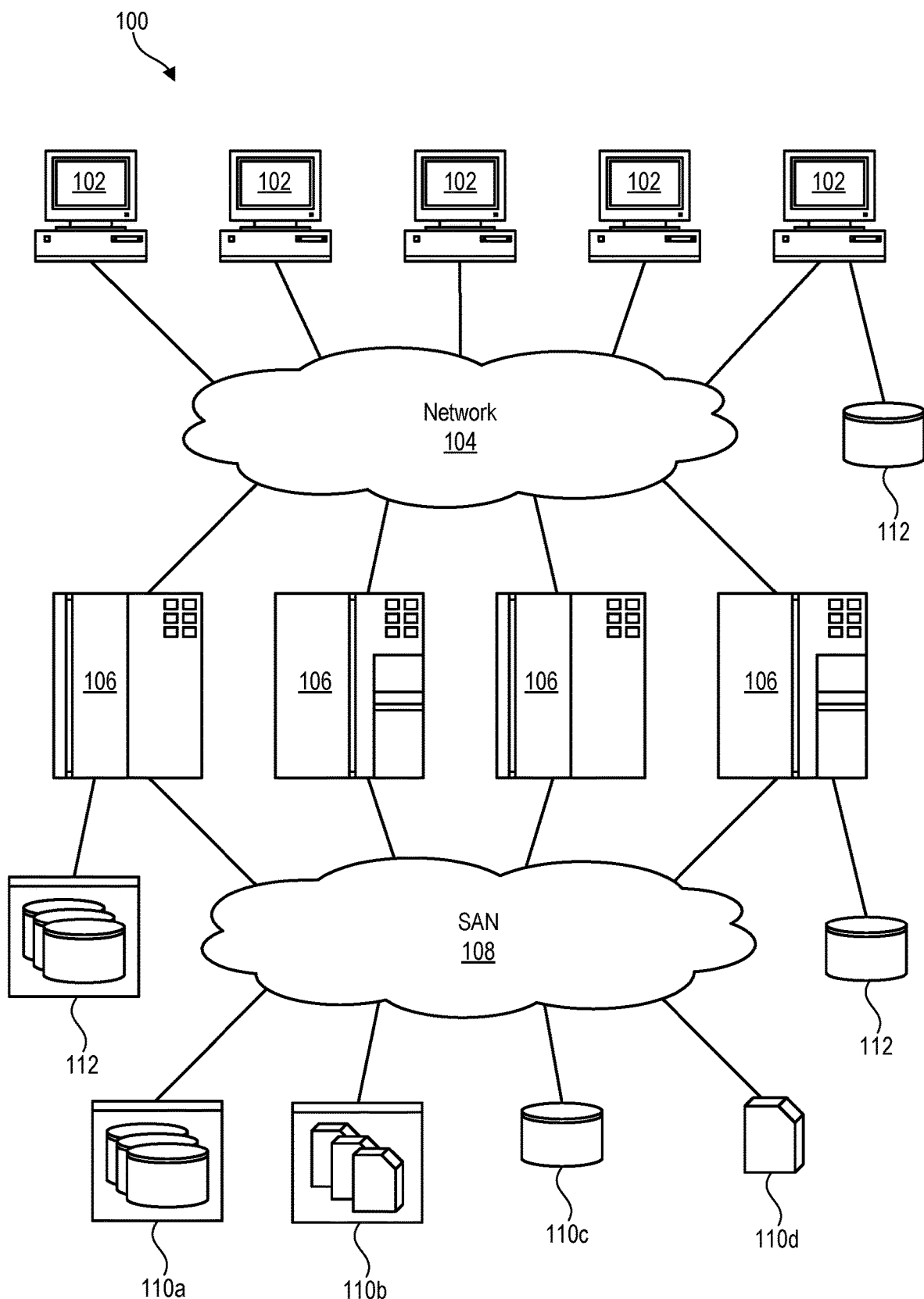
FIG. 1 is a high-level block diagram showing one example of an environment in which a system and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where embodiments of the invention may operate. The network architecture 100 is presented only by way of example and not limitation. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

In certain embodiments, the storage systems 110 illustrated in FIG. 1 may be organized into a tiered storage configuration. That is, some storage systems 110 (such as faster, higher-performance storage systems) may be used as primary storage, while other storage systems 110 (such as slower, lower-performance storage systems 110) may be used as secondary storage. For example, a disk array 100a comprising solid state drives and/or hard disk drives may be used as primary storage, while a tape library 110b may be used as secondary storage. Data that is hotter, newer, and/or more important may be stored on primary storage, while data that is colder, older, and/or less important may be moved to secondary storage.

Figure 2:
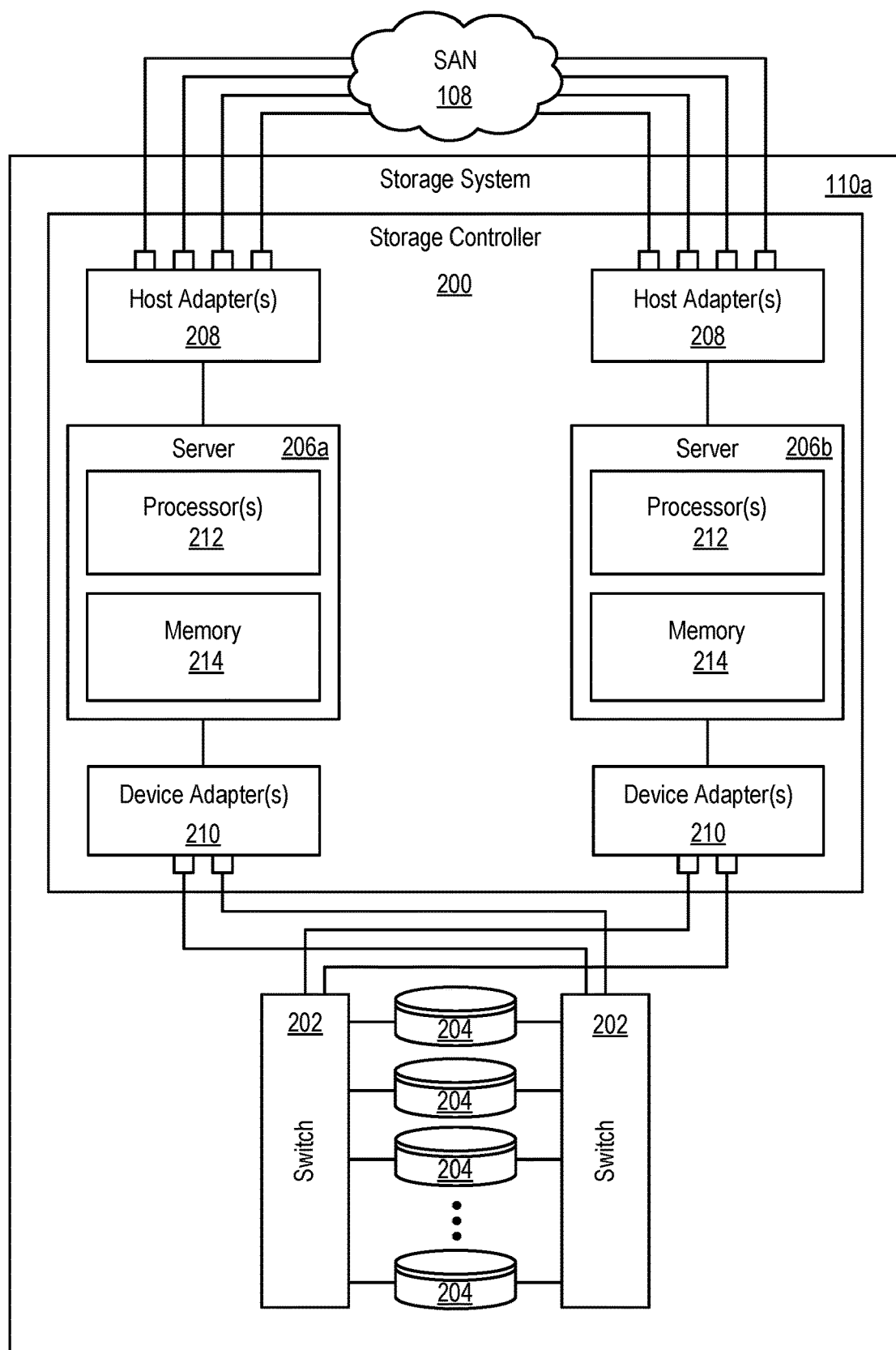
FIG. 2 is a high-level block diagram showing one embodiment of a storage system providing primary and/or secondary storage.

Referring to FIG. 2, one example of a storage system 110a containing an array of hard-disk drives 204 and/or solid-state drives 204 is illustrated. The internal components of the storage system 110a are shown since a tiered storage system may, in certain embodiments, be implemented within such a storage system 110a. For example, higher performance storage drives 204 may be used as primary storage, while lower performance storage drives 204, either on the same or a different storage system 110a, may be used as secondary storage. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the methods disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
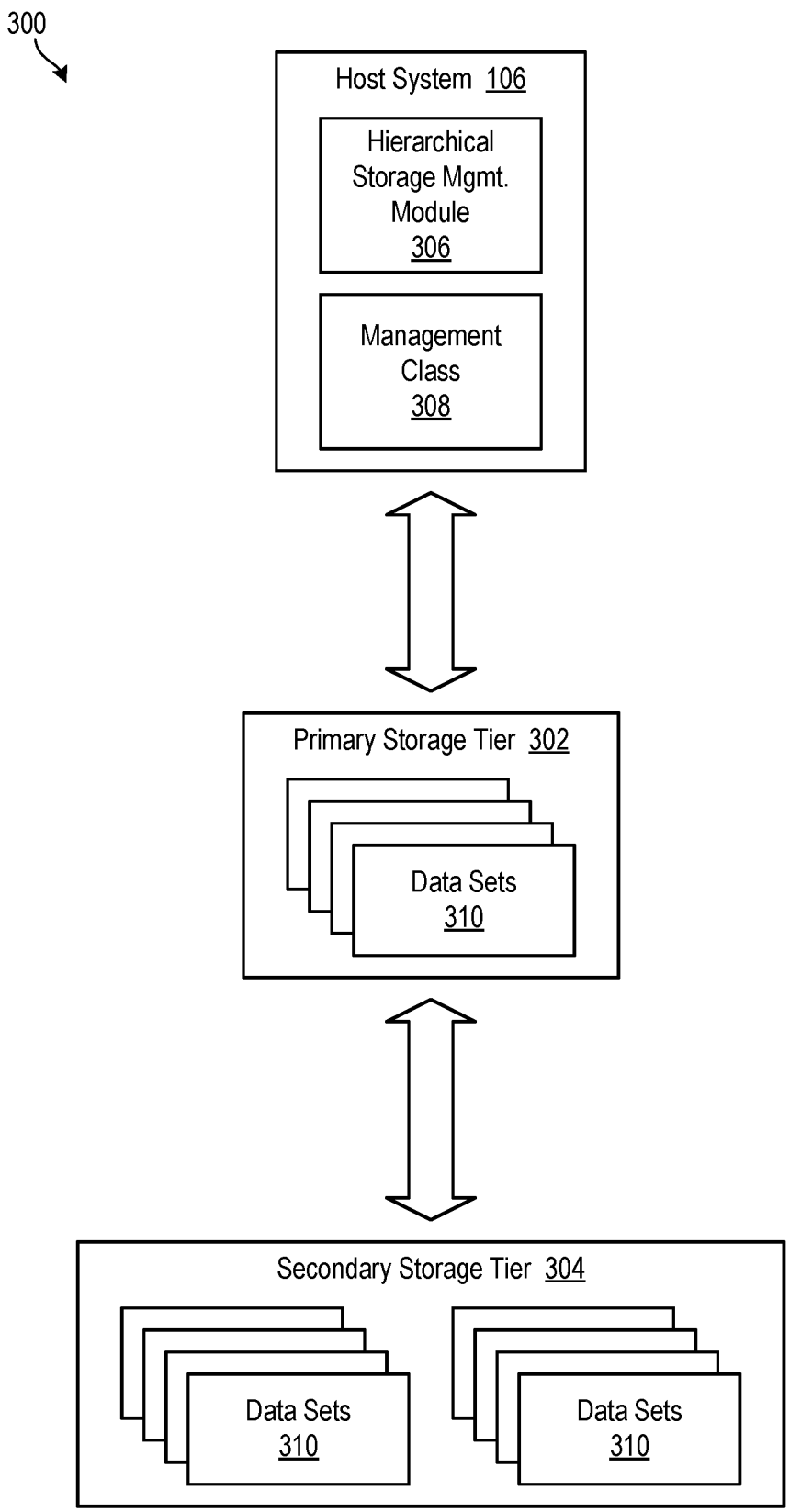
FIG. 3 is a high-level block diagram showing movement of data sets between primary and secondary storage in a tiered storage system.

Referring to FIG. 3, one embodiment of a tiered storage system 300 comprising a primary storage tier 302 and a secondary storage tier 304 is illustrated. The primary storage tier 302 contains faster and more expensive storage media than the secondary storage tier 304. The secondary storage tier 304 may also include more storage capacity than the primary storage tier 302 due to its lower cost. As shown, each of the storage tiers 302, 304 stores one or more data sets 310. Data sets 310 that are stored on each tier 302, 304 may be based on characteristics of the data sets 310, such as the "hotness" or "coldness" of the data sets 310, the age of the data sets 310, the size of the data sets 310, the generation (i.e., version) represented by the data sets 310, or the like.

As shown, a host system 106 includes a storage management module 306 to move data sets 310 between the storage tiers 302, 304 in accordance with their characteristics. A management class 308, associated with particular data sets 310, may establish how and when the data sets 310 are moved between the storage tiers 302, 304. For example, the management class 308 specify a number of days a data set 310 is retained on the primary storage tier 302, a number of generations (e.g., previous versions, etc.) of a data set 310 that may be retained on the primary storage tier 302, and/or the size of data sets 310 that may be retained on the primary storage tier 302. When the characteristics of data sets 310 satisfy the criteria specified in the management class 308, the storage management module 306 may move the data sets 310 from the primary storage tier 302 to the secondary storage tier 304 (or vice versa). This will ideally free up storage space on the primary storage tier 302 that can be used for other purposes, such as storing new data sets 310 or accommodating growth of existing data sets 310. When characteristics of the data sets 310 on the secondary storage tier 304 change to require more frequent access, the data sets 310 may be recalled to the primary storage tier 302.

Figure 4:
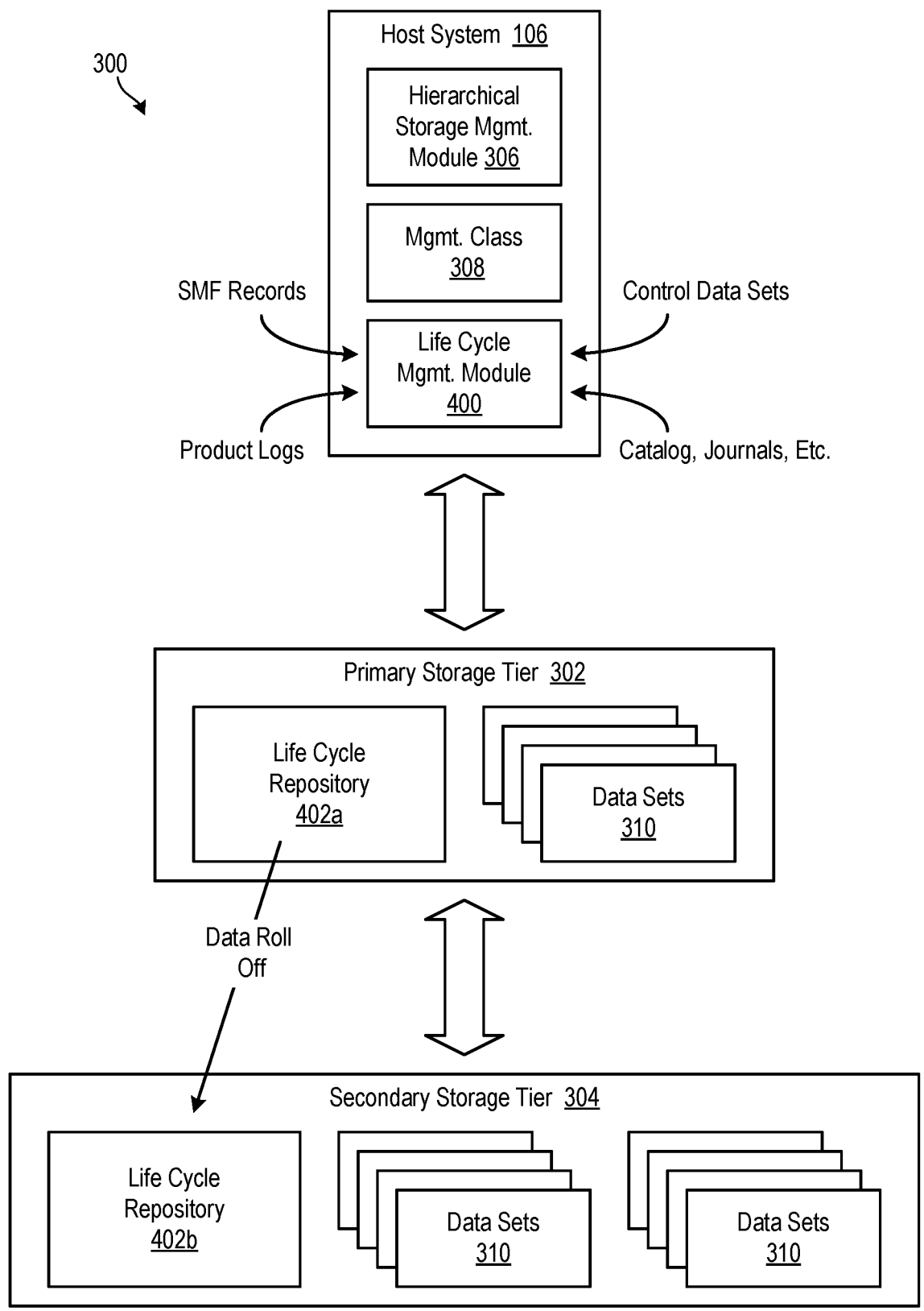
FIG. 4 is a high-level block diagram showing a life cycle repository in accordance with the invention, as well as a life cycle management module for managing data in the life cycle repository.

Referring to FIG. 4, as previously mentioned, when a data set 310 in a tiered storage system 300 goes missing, it can be extremely difficult for a user to determine what happened to the data set 310 and/or why it happened. In certain cases, the user may need to retrieve historical and/or policy information from various disparate sources to try to piece together a picture of what took place. This information can be difficult to find and/or extract. In many cases, information that is needed is no longer available, making it difficult if not impossible to determine what actions were performed on the data set 310 and/or the reasons for the actions.

In order to enable users to more easily track actions associated with data sets 310 over their life times, a life cycle management module 400 may be provided. This life cycle management module 400 may be implemented in hardware, software, firmware, or combinations thereof. As shown, the life cycle management module 400 is embodied in the host system 106 although the life cycle management module 400 is not limited to such an implementation. In other embodiments, the life cycle management module 400 is embodied as a stand-alone appliance, in a storage system 110 such as that illustrated in FIG. 2, or distributed across multiple machines or systems.

In general, the life cycle management module 400 may draw from various disparate sources of historical information that describe actions performed on data sets 310. These sources of historical information may include, for example, System Management Facility (SMF) records; product logs such as logs from Hierarchical Storage Management (HSM) or other tiered storage management software; control data sets such as backup control data sets, migration control data sets, offline control data sets, and the like; and catalogs or journals that document access to data sets. The life cycle management module 400 gathers this historical information and stores this information in a centralized life cycle repository 402. Historical information that is gathered and stored by the life cycle management module 400 may include, for example, job names of jobs that performed actions on data sets 310; system names associated with actions performed on data sets 310; timestamps associated with actions performed on data sets 310; user identifiers associated with actions performed on data sets 310; and/or the like.

In the illustrated embodiment, the life cycle repository 402 is stored on the same storage media or storage system as the data sets 310 that it tracks, although it could also be hosted on a different storage system or storage media. In a tiered storage system 300, such as that illustrated in FIG. 4, the life cycle repository 402 may be distributed across multiple tiers 302, 304 of the tiered storage system 300. More recent information or records may be stored in a first portion of the life cycle repository 402a residing on a primary storage tier 302. As this information grows and/or ages, this information may be rolled off or archived to a second portion of the life cycle repository 402b, residing on a secondary storage tier 304. This is just one example of how the life cycle repository 402 may be implemented on a tiered storage system 300 and is not intended to be limiting.

In addition to storing data set life cycle information in the life cycle repository 402, the life cycle management module 400 may also be configured to determine policies that are responsible for actions performed on data sets 310 and/or where the policies originated (i.e., what software/hardware product originated the policies). For example, if a data set 310 was deleted from the tiered storage system 300, the life cycle management module 400 may determine what policy caused the data set 310 to be deleted. For example, the data set 310 may have been deleted due to reaching a generation limit, because a newer version of the data set 310 was archived or backed up elsewhere, or because the data set 310 reached a specified age. The life cycle management module 400 may be configured to track down or determine this information so that users can understand the reasons why a particular action was taken. This may enable the user to change the underlying policy so that the action does not happen again, or occurs with less frequency or at desired times. If a user is responsible for a particular action (e.g., a manual delete, manual move, etc.) on a data set 310, the life cycle management module 400 may be configured to determine a user identifier or other information identifying who took the action.

Figure 5:
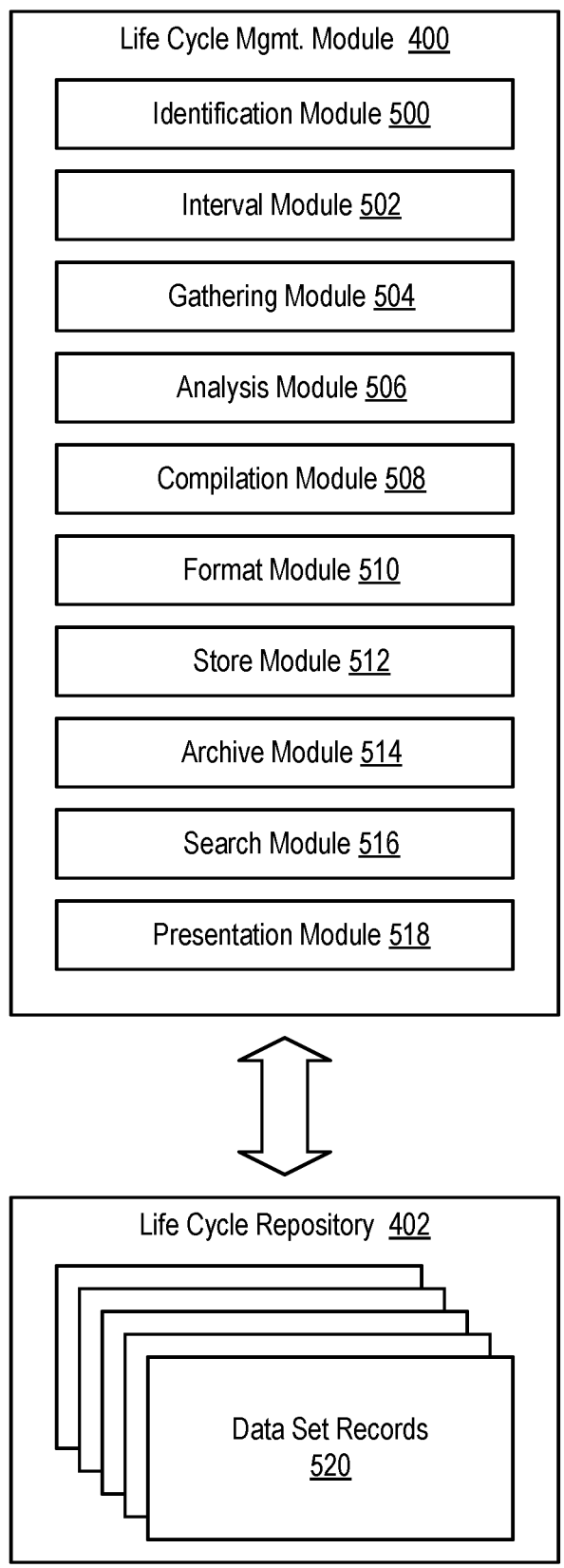
FIG. 5 is a high-level block diagram showing various sub-modules within the life cycle management module.

Referring to FIG. 5, various sub-modules may be provided in a life cycle management module 400 in accordance with the invention to provide various features and functions. These sub-modules may include one or more of an identification module 500, interval module 502, gathering module 504, analysis module 506, compilation module 508, format module 510, store module 512, archive module 514, search module 516, and presentation module 518. The modules are presented by way of example and not limitation.

The identification module 500 may be configured to identify sources of historical information. These may include, for example, SMF records (particularly SMF 60-66 records which show changes to catalogued data sets 310), product logs, control data sets, catalogs, journals, or the like. In many cases, the historical information will originate from disparate products (i.e., software, hardware) or data stores that record historical information in different formats and locations.

The interval module 502 may be configured to invoke the life cycle management module 400 at specified intervals. In one example, the life cycle management module 400 is invoked every twenty-four hours, such as at the end of each day or during a period of reduced I/O to the tiered storage system 300. Operating during periods of reduced I/O will enable the life cycle management module 400 to determine what actions were performed on data sets 310 during the previous twenty-four hour period without competing with peak I/O. Other intervals (i.e., every hour, every week, every month) are also possible and within the scope of the invention. In certain embodiments, the interval is set to an initial default value but is configured to be modifiable by an end user.

When the life cycle management module 400 is invoked at the specified interval, the gathering module 504 gathers historical information from the various sources in order to determine what actions were performed on a data set 310. Such actions may include delete actions, define actions, rename actions (such as changing a volume serial number), migration actions, movement of a data set 310 from one volume to another, expiration actions (such as where a data set 310 is deleted due to reaching a generational limit or reaching a specified age), actions that return space occupied by a data set 310 to scratch, movement of a data set 310 to a new catalog, and the like. For example, tape management control data sets or logs may be scanned to identify when volumes related to the data sets were returned to scratch. In another example, information may be pulled from a catalog that includes scratch/noscratch, purge/nopurge attributes and a generation limit to be able to determine activity against a generation data set. The gathering module 504 may also gather information about actors that performed the actions, such as jobs that were associated with the actions, systems associated with the actions, user identifiers associated with the actions, and the like. The gathering module 504 may also gather timing information, such as timestamps, documenting when the actions occurred.

The analysis module 506 may determine if an action is the result of an established policy and, if possible, what the policy is. For example, if a data set 310 was migrated or deleted during the previous twenty-four hour period, the analysis module 506 may determine why the data set 310 was migrated or deleted. In certain embodiments, the analysis module 506 may refer to a management class 308 as previously discussed to make this determination. For example, the management class 308 may specify a number of days a data set 310 is retained on the primary storage tier 302, a number of generations (e.g., previous versions, etc.) of a data set 310 that may be retained on the primary storage tier 302, and/or the size of data sets 310 that may be retained on the primary storage tier 302. If a version of a data set 310 has been deleted, it may be because the data set 310 hit a generation limit. Similarly, if the data set 310 was migrated from faster storage media to slower storage media during the previous twenty-four hour period, it may be the result of the data set 310 reaching a specified age or becoming "cold." The analysis module 506 may gather and/or determine this policy information where possible for inclusion in the life cycle repository 402. In making these determinations, the analysis module 506 may analyze settings or parameters of various products or features, such as the settings or parameters associated with the management class 308 discussed above.

Figure 6:
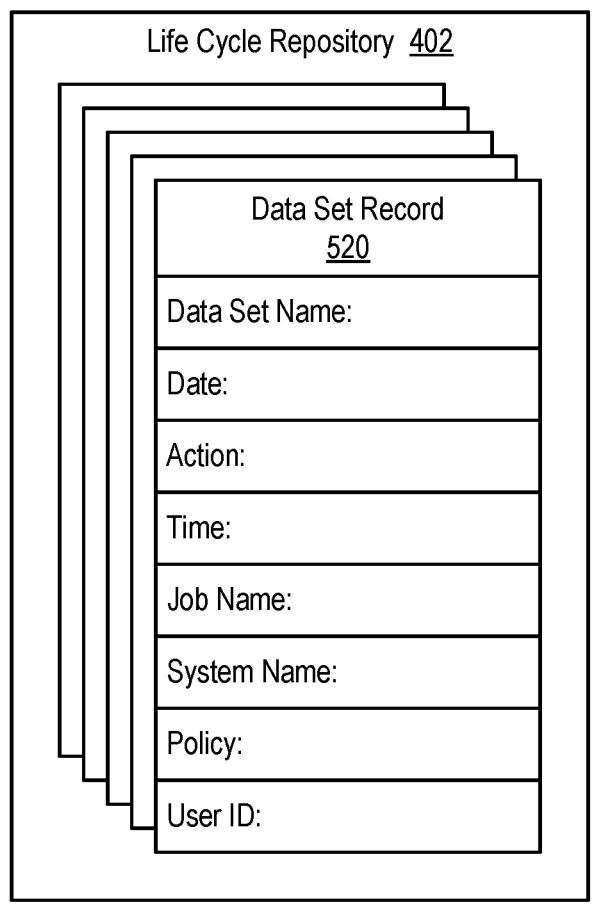
FIG. 6 is a high-level block diagram showing one embodiment of a data set record in the life cycle repository.

Once desired historical and policy information is gathered and/or determined, the compilation module 508 may compile this information and the format module 510 may format this information for storage in the life cycle repository 402. In certain embodiments, the format module 510 formats the information in the form of individual records 520 for each data set 310. A record 520 may be created for each data set 310 on which an action occurred within the previous twenty-four hour period. If multiple actions occurred during the previous twenty-four hour period, each of these actions may be stored in the record under the same data set name and date key value. One example of such a data set record 520 is shown in FIG. 6. As shown in FIG. 6, the data set record 520 may include a data set name and date that act as a key value for the record 520. A data portion of the record 520 may contain information describing the activity and the time the activity was performed, who performed the action, and/or why the activity took place. In the illustrated example, the record 520 describes the action that was performed, a time the action was performed, a job name associated with the action, a system name associated with the action, a policy associated with the action, and a user identifier associated with the action.

Referring again to FIG. 5, once the historical and policy information is formatted in the desired manner, the store module 512 may store the information in the life cycle repository 402. In certain embodiments, the information will initially be stored on the primary storage tier 302. As this information ages or grows, the archive module 514 may roll this information off to the secondary storage tier 304 or to another storage tier used for archive purposes. Alternatively, the information may be pushed directly to the secondary storage tier 304 or another archive tier since the life cycle information may not be routinely accessed.

One of the benefits of the life cycle management module 400 is that enables easy retrieval and review of historical and policy information associated with a data set 310. The search module 516 may enable a user to search through the data set records 520 by entering a data set name and date or date range associated with a time period of interest. The search module 516 may then retrieve the corresponding data set records 520 from the life cycle repository 402. The presentation module 518 may then present or display the information in a desired format. In certain embodiments, the information from the data set records 520 is presented from oldest to newest (or vice versa) to show a sequence of events that took place in association with a data set 310. One example of a format for displaying or presenting the historical information and associated policy is shown in FIG. 7. This represents just one contemplated format and is not intended to be limiting. As shown in FIG. 7, a life cycle (or subset thereof) of a data set 310 may be displayed in chronological order. This life cycle may describe actions performed on the data set 310 as well as the actors (jobs, systems, users, etc.) that performed or originated the actions. Where applicable, the life cycle may list policies that were responsible for the actions.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for tracking past actions performed in association with a data set, the method comprising:
    identifying a plurality of sources of historical information describing past actions performed on a data set over time, wherein the sources are disparate products that record the historical information in different formats and locations, and the past actions include at least one of deleting, modifying, and moving the data set;
    gathering the historical information from the plurality of sources;
    determining established policies that caused the past actions, the established policies including at least one of policies to delete a data set when a specified generation limit has been reached, policies to delete a data set when the data set has been backed up or archived elsewhere, policies to delete a data set when the data set has reached a specified age, and policies to migrate a data set when data in the data set has reached a specified temperature or age;
    collecting the historical information and storing the historical information in a centralized repository; and
    documenting, with the historical information in the centralized repository, the established policies responsible for causing the past actions.

2. The method of claim 1, wherein determining the established policies comprises determining where the established policies originated.

3. The method of claim 1, wherein gathering the historical information comprises gathering the historical information at established intervals.

4. The method of claim 1, wherein the historical information is selected from the group consisting of: job names associated with past actions performed on the data set; system names associated with past actions performed on the data set; timestamps associated with past actions performed on the data set; and user identifiers associated with past actions performed on the data set.

5. The method of claim 1, wherein the past actions are selected from the group consisting of: delete actions, define actions, rename actions, migration actions, volume-to-volume movement actions, expiration actions, return-to-scratch actions, and movement-to-a-new-catalog actions.

6. The method of claim 1, wherein storing the historical information comprises generating at least one record that documents the historical information and includes, in a key value associated with each record, a name of the data set.

7. A computer program product for tracking past actions performed in association with a data set, the computer program product comprising a computer-readable storage medium having computer-usable program code embodied therein, the computer-usable program code comprising:

computer-usable program code to identify a plurality of sources of historical information describing past actions performed on a data set over time, wherein the sources are disparate products that record the historical information in different formats and locations, and the past actions include at least one of deleting, modifying, and moving the data set;

computer-usable program code to gather the historical information from the plurality of sources;

computer-usable program code to determine established policies that caused the past actions, the established policies including at least one of policies to delete a data set when a specified generation limit has been reached, policies to delete a data set when the data set has been backed up or archived elsewhere, policies to delete a data set when the data set has reached a specified age, and policies to migrate a data set when data in the data set has reached a specified temperature or age;

computer-usable program code to collect the historical information and store the historical information in a centralized repository; and computer-usable program code to document, with the historical information in the centralized repository, the established policies responsible for causing the past actions.

8. The computer program product of claim 7, wherein determining the established policies comprises determining where the established policies originated.

9. The computer program product of claim 7, wherein gathering the historical information comprises gathering the historical information at established intervals.

10. The computer program product of claim 7, wherein the historical information is selected from the group consisting of: job names associated with past actions performed on the data set; system names associated with past actions performed on the data set; timestamps associated with past actions performed on the data set; and user identifiers associated with past actions performed on the data set.

11. The computer program product of claim 7, wherein the past actions are selected from the group consisting of: delete actions, define actions, rename actions, migration actions, volume-to-volume movement actions, expiration actions, return-to-scratch actions, and movement-to-a-new-catalog actions.

12. The computer program product of claim 7, wherein storing the historical information comprises generating at least one record that documents the historical information and includes, in a key value associated with each record, a name of the data set.

13. A system for tracking past actions performed in association with a data set, the system comprising:

at least one processor;

at least one memory device coupled to the at least one processor and storing instructions for execution on the at least one processor, the instructions causing the at least one processor to;

identify a plurality of sources of historical information describing past actions performed on a data set over time, wherein the sources are disparate products that record the historical information in different formats and locations, and the past actions include at least one of deleting, modifying, and moving the data set;

gather the historical information from the plurality of sources;

determine established policies that caused the past actions, the established policies including at least one of policies to delete a data set when a specified generation limit has been reached, policies to delete a data set when the data set has been backed up or archived elsewhere, policies to delete a data set when the data set has reached a specified age, and policies to migrate a data set when data in the data set has reached a specified temperature or age;

collect the historical information and store the historical information in a centralized repository; and include, with the historical information in the centralized repository, the established policies responsible for causing the past actions.

14. The system of claim 13, wherein determining the established policies comprises determining where the established policies originated.

15. The system of claim 13, wherein gathering the historical information comprises gathering the historical information at established intervals.

16. The system of claim 13, wherein the historical information is selected from the group consisting of: job names associated with past actions performed on the data set; system names associated with past actions performed on the data set; timestamps associated with past actions performed on the data set; and user identifiers associated with past actions performed on the data set.

17. The system of claim 13, wherein the past actions are selected from the group consisting of: delete actions, define actions, rename actions, migration actions, volume-to-volume movement actions, expiration actions, return-to-scratch actions, and movement-to-a-new-catalog actions.

\* \* \* \* \*